June 27, 1961  E. A. EBERT  2,989,816
FISHING SPOONS
Filed Dec. 20, 1956  3 Sheets-Sheet 1
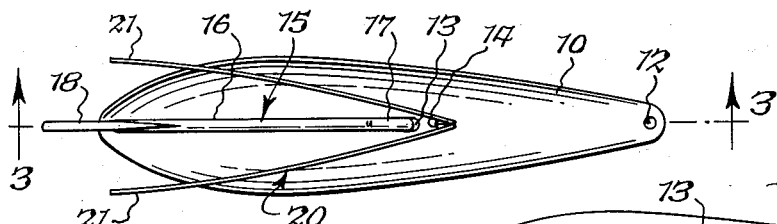
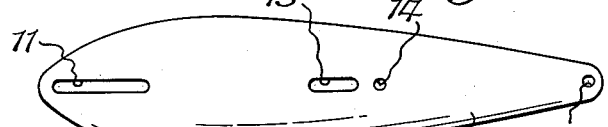
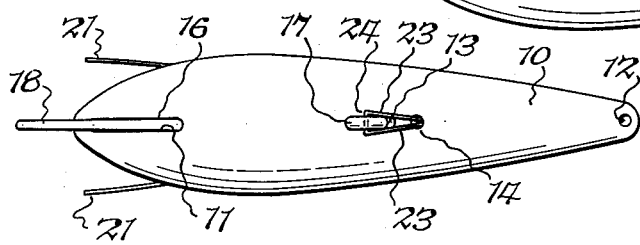
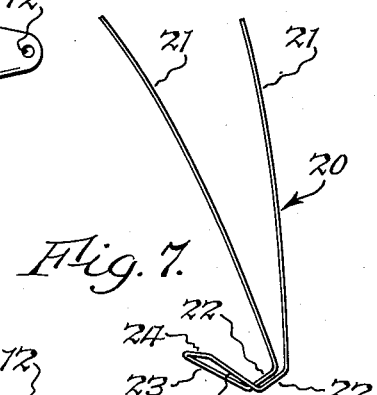
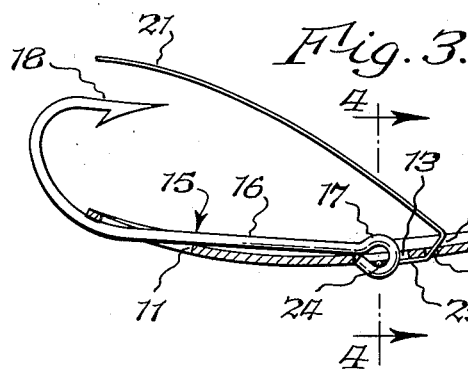
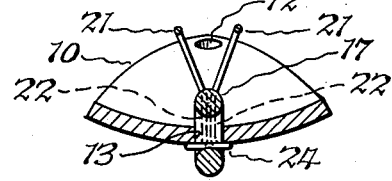
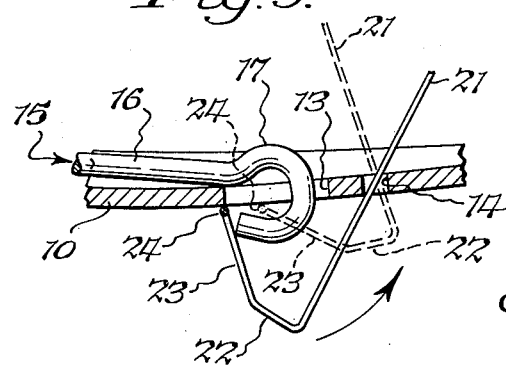
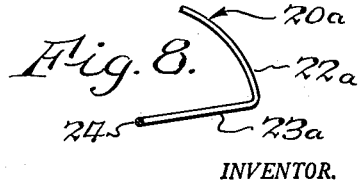
INVENTOR.
Edward A. Ebert

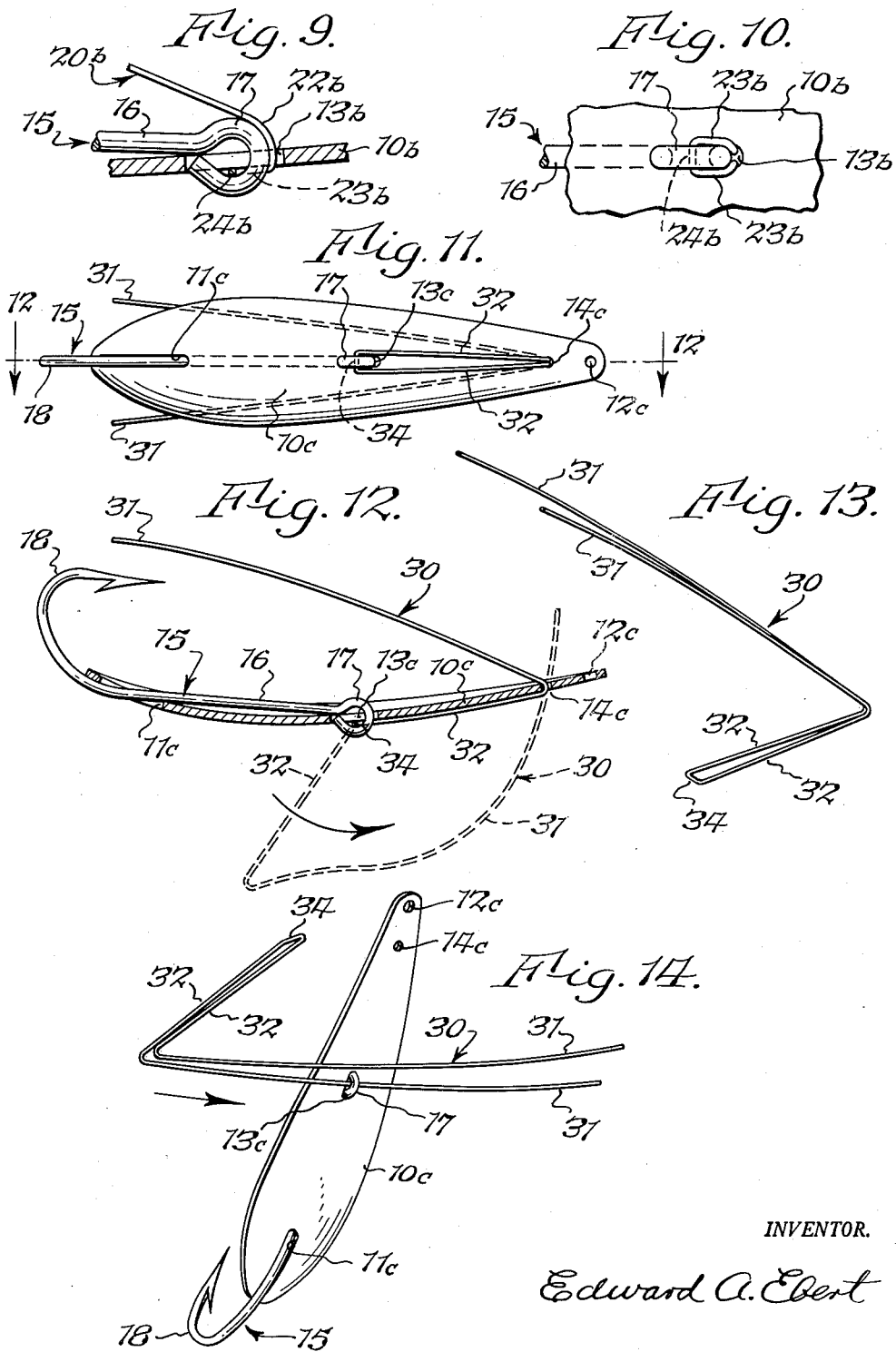

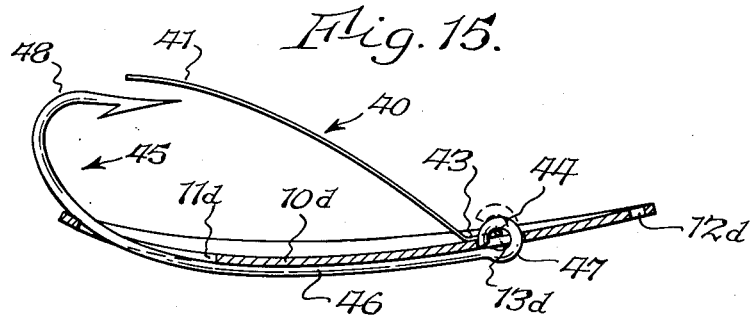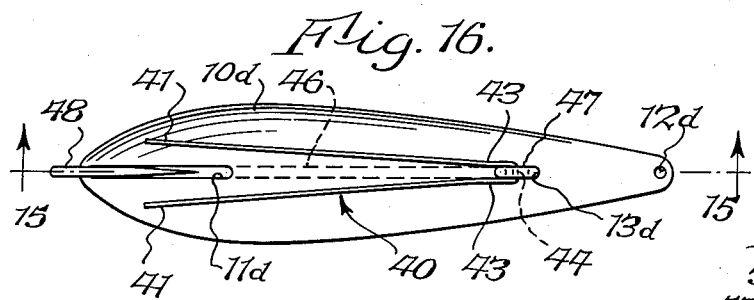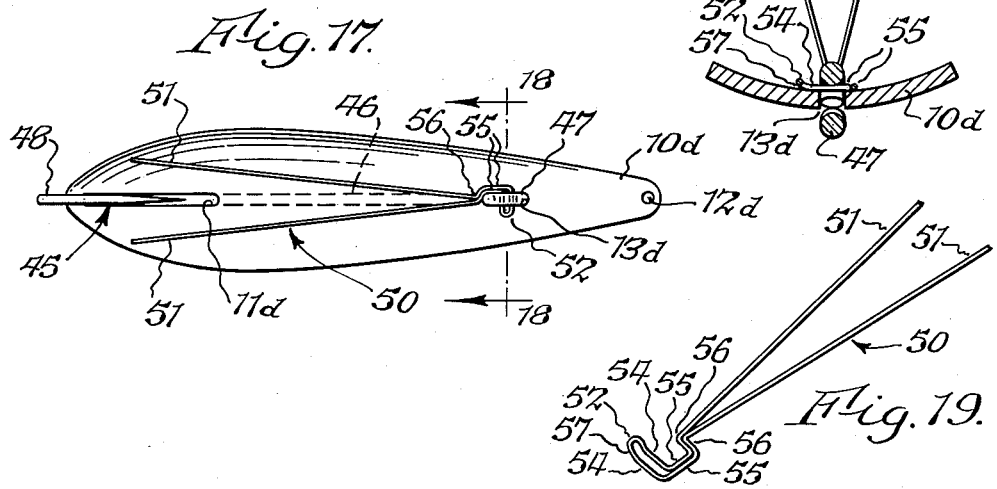

__
United States Patent Office 2,989,816
Patented June 27, 1961

2,989,816
FISHING SPOONS
Edward A. Ebert, 203 Huxley Drive, Snyder 21, N.Y.
Filed Dec. 20, 1956, Ser. No. 629,503
3 Claims. (Cl. 43—42.4)

This invention relates to artificial spoon baits used in fishing and more particularly to weedless spoons of this type having a single hook.

Problems in manufacture of these spoons are encountered such as plating, polishing, painting and finishing before assembly to the hook and weedguard—the cost of the fastening means—the cost of assembling and the elimination of projections upon which weeds will catch.

A prime object of this invention is to provide a spoon which permits finishing of the spoon body completely before assembly.

A still further object is to provide a spoon which can be rapidly assembled and does not require an added fastening means, such as screws, rivets or solder.

Another object is to provide a spoon which can be assembled with a simple tool or in some instances without any tools.

In the accompanying drawings:

FIG. 1 is a top plan view of one form of weedless spoon.

FIG. 2 is a bottom plan view.

FIG. 3 is a longitudinal section along the line 3—3 of FIG. 1.

FIG. 4 is a vertical cross section taken along the line 4—4 of FIG. 3.

FIG. 5 is an enlarged section similar to FIG. 3 showing a step in assembling the weed guard to the hook eye and spoon body.

FIG. 6 is a plan view of the spoon body.

FIG. 7 is a perspective of the weed guard.

FIG. 8 is a vertical section similar to FIG. 3 of a modified weed guard.

FIG. 9 is a vertical section similar to FIG. 3 of an alternate form of the invention.

FIG. 10 is a bottom plan view of FIG. 9.

FIG. 11 is a bottom plan view of a form of the invention in which assembly is made without any tools.

FIG. 12 is a vertical section taken along the line 12—12, FIG. 11.

FIG. 13 is a perspective of the weed guard used in the form shown in FIGS. 11 and 12.

FIG. 14 is a perspective showing the start of assembly of the spoon shown in FIGS. 11 and 12.

FIG. 15 is a vertical section taken along the line 15—15 of FIG. 16.

FIG. 16 is a top plan view of FIG. 15.

FIG. 17 is a view similar to FIG. 16 of another form of weed guard.

FIG. 18 is a section taken along the line 18—18 of FIG. 17.

FIG. 19 is a perspective of the weed guard shown in FIGS. 17 and 18.

In the form of the invention shown in FIGS. 1 through 7 the numeral 10 represents a spoon body having a punched slot 11 at its tail or trailing end, a punched hole 12 at its head end and a slot 13 and a hole 14 intermediate the slot 11 and hole 12, all of these openings being along the longitudinal center line of the spoon.

The slot 11 is provided to receive a fish hook 15 having a shank portion 16, a ringed eye 17 at one end and at the other end having a reverse bend 18 provided with a pointed end. This hook 15, before completion of assembly to the spoon body 10, has its ringed eye 17 open or not completely closed, as shown in FIG. 5. It will be noted that the reverse bend 18 and eye 17 are in a common plane.

A weed guard member 20 of a length of spring wire and of generally U-shaped configuration, as shown in FIG. 7, has two whisker or guard ends 21, 21. These guard ends 21 have a bend portion 22, 22 at an angle of about 90 degrees to the guard ends 21, 21, and then are bent toward the guard ends 21, 21 at about 45 degrees forming the portions 23, 23, which are connected at the base of the U by a connecting cross bar 24.

To assemble the parts just described, the point 18 of the hook 15 is entered into the slot 11 of the spoon 10. The open ringed eye 17 is then swung downwardly into the slot 13. The guard ends 21 are then entered into the hole 14 and the connecting portion 24 positioned to enter the open eye 17 of the fish hook 15. The weed guard is then swung in the direction of the arrow, as shown in FIG. 5, through the dotted line position into that shown in FIG. 3. The open eye 17 is then closed as shown in FIG. 3, which tightly secures all parts together.

It will be seen in FIG. 3 that the portions 22, 22 of the weed guard 20 serve to prevent reverse rotation opposite to the arrow shown in FIG. 5, which would permit the guard ends 21, 21 to swing toward the head end, i.e. to the right to a limited amount if the portions 22, 22 were not provided.

If it is desired, as shown in FIG. 8, to have a swinging type of weed guard 20a, the straight portions 22, 22 may be made arcuate, each arc 22a having its center at the cross part 24a to permit the weed guard to swing away from the hook point 18 to the extent that the hole 14 will permit. This swinging movement is limited by the length of the arcuate portions 22a.

In FIGS. 9 and 10 I have shown a hook 15, spoon 10b and weed guard 20b generally similar to those previously described with the exception that the spoon 10b is unprovided with an opening 14 and the slot 13b is somewhat longer than the slot 13 and the weed guard 20b passes through the same slot 13b in which the eye 17 of the hook 15 is retained. The shape of this weed guard is the same as that shown in FIG. 8 with the exception for having a shorter straight portion 23b between the cross member 24b and the arcuate portion 22b.

The lure shown in FIGS. 11-14 is assembled without tools and the eye 17 of the hook 15 is closed to start with. As clearly shown in FIG. 13, the weed guard 30 comprises a generally U-shaped spring wire having two guarding legs 31, 31 bent at approximately 30 degrees from more or less straight portions 32, 32 connected by a cross bar 34. The spoon body 10c has a slot 11c, hole 12c and slot 13c generally similar to those shown in FIGS. 1-8, but the hole 14c is located farther away from the slot 13c, the reason for which will be presently made obvious. To assemble this lure, the reverse bend 18 and point of the hook is entered into the slot 11c of the spoon and the eye 17 is swung downwardly into the slot 13c. One of the legs 31 is then fed into that part of the eye 17 projecting beyond a face of the spoon body 10c, this being illustrated as being its convex face. This movement is continued until the cross bar 34 has positioned itself in the eye 17 and across the slot 13c. Legs 31, 31, pressed together, are then entered and fed through the opening 14c to the other face of the spoon body 10c where the legs 31, 31 will be positioned in weed guarding position to the point of the hook 15 and securely fasten the hook 15, spoon 10c and weed guard 30 together.

In FIGS. 15 and 16 the spoon body 10d is identical to that shown in FIGS. 1-8 with the exception that it is unprovided with the opening 14. The hook 45 in this form has its shank 46 mounted below the spoon body 10d and the shank portion 46 may be shaped to conform closely to the shape of the spoon body. Also the eye 47 is shown bent upwardly instead of downwardly and may or may not, as desired, be open or closed prior to assembly. To assemble, the reverse bend 48 is entered upwardly through the slot 11*d* and the eye 47 is positioned so that the cross bar 44 of the weed guard 40 may enter the eye 47. Completion of closing the eye 47 then will hold the spoon 10*d*, hook 45 and weed guard 40 in secure relationship. A straight portion 43 of the weed guard lying against the upper face of the spoon 10*d* holds the guard legs 41 in proper weed guarding position in relation to the hook point. If used with a closed eye 47, the procedure in assembly would be similar to that just discussed in relation to FIGS. 12, 13 and 14.

In FIGS. 17, 18 and 19 is illustrated another form of weed guard 50 which has a pair of legs 51, 51 and is also generally U-shaped. While in previous showings all of the weed guards had their weed guarding legs straddling the eye of the hook and their cross member enclosed by the eye of the hook, this form uses two members in the eye and across the slot 13*d* of the spoon body 10*d*. The members 51, 51 are joined at 52 and have portions 54, 54 which form the cross bars for anchoring the hook eye 47. A right angle bend then provides portions 55, 55 running parallel to the plane of the hook eye 47 and the upper face of the spoon body 10*d* and then have bends 56, 56 to bring the legs 51, 51 to the center line of the spoon body where they also project angularly upwardly toward the end of the hook. A slight upward bend is provided near the joined portions 52 for ease in entering the hook eye 47 in assembly. Either an open or closed eye may be used and assembly is done from the side of the eye if a closed eye is used.

If it is desired to provide a lure without a weed guard, the construction shown in FIGS. 20–22 may be used, this construction still taking advantage of the simplicity and quick assembly of the aforementioned designs. The spoon body 10*e* is provided with a slot 11*e* for the reverse bend 18 of the hook 15 and also with a hole 12*e*. Intermediate this slot 11*e* and hole 12*e* a pair of openings is provided comprising a forward opening or slot 63 and a rearward opening 64. In this modification the eye 17 of the hook 15 is provided in open condition, as clearly shown in FIG. 22, and is entered into the slot 63. It is then slid rearwardly in the direction of the arrow to the position shown in FIG. 21, whereupon the eye 17 is closed. This closes the eye 17 around the cross bar 65 which has been formed between the holes 63 and 64, the terminal end of the eye 17 entering the opening 64.

In all of the forms shown it is desirable that the slots 11 and 11*a*—11*d* be of such dimension that the spring of the spoon body and that of the hook shank will tend to urge the eye out of the openings 13, 13*a*, 13*b*, 13*c*, 13*d* or 63 this eliminating looseness between the hook and spoon body when assembly is completed.

From the foregoing it will be seen that this invention makes possible a quick and simple assembly of a hook and a spoon with a weed guard without separate fastening device, such as rivets, solder, screws etc., by a simple operation with a simple tool to close the eye of the hook or in some forms without any tools.

I claim:

1. A spoon type fishing lure comprising an elongated spoon having a first opening at its trailing end, there being a second opening intermediate the ends of said spoon and a slot intermediate said first and second openings extending lengthwise of said spoon, said first and second openings and said slot being through openings from one face of said spoon to the other face and being unobstructed on either side by any other part of said spoon, a fish hook extending through said first opening and having a shank extending along said one face of said spoon and also having a reverse bend at one end and a ring eye being arranged generally in a common plane with said reverse bend, said ring eye being arranged in said slot with a portion arranged to project beyond said other face of said spoon, and a flexible weed guard extending through said second opening from said one face to said other face and having one end against said other face of said spoon and extending through said ring eye portion projecting beyond said other face of said spoon, said part of said weed guard extending through said ring eye portion forming the sole means for preventing said ring eye from passing from said other face of said spoon to the said one face, and the other end of said weed guard projecting adjacent said one face of said spoon toward said reverse bend of said hook.

2. A spoon type fishing lure comprising an elongated spoon having a first opening at its trailing end, there being a second opening intermediate the ends of said spoon and a slot intermediate said first and second openings extending lengthwise of said spoon, said first and second openings and said slot being through openings from one face of said spoon to the other face and being unobstructed on either side by any other part of said spoon, a fish hook extending through said first opening and having a shank extending along one face of said spoon and also having a reverse bend at one end and a ring eye being arranged generally in a common plane with said reverse bend, said ring eye being arranged in said slot with a portion arranged to project beyond the other face of said spoon, and a flexible weed guard of U-shaped form having a cross bar extending through said ring eye on said other face of said spoon and forming the sole means for preventing said ring eye from displacement from said slot and having portions adjacent and connected by said cross bar extending through said second opening and having ends projecting toward said reverse bend of said fish hook.

3. A spoon type fishing lure, comprising an elongated spoon having a first opening at its trailing end, and a slot intermediate its ends and extending lengthwise of said spoon, said first opening and said slot being through openings from one face of said spoon to the other face and being unobstructed on either side by any other part of said spoon, a fish hook extending through said first opening and having a shank extending along said one face of said spoon and having a reverse bend at one end and a ring eye at its other end, said reverse bend and ring eye being arranged generally in a common plane, said ring eye being arranged in said slot with a portion arranged to project beyond said other face of said spoon, and a flexible weed guard having a cross bar at one end said crossbar being longer than the width of said slot and arranged along said other face of said spoon and extending through said ring eye and forming the sole means to prevent displacement of said ring eye toward said one face from said other face, and said weed guard having its other end projecting toward said reverse bend of said hook.

References Cited in the file of this patent

UNITED STATES PATENTS

| 2,088,669 | Shutter | Aug. 3, 1937 |
| 2,167,163 | Toepper | July 25, 1939 |
| 2,615,277 | Hayden | Oct. 28, 1952 |